United States Patent [19]
McNally

[11] 3,791,494
[45] Feb. 12, 1974

[54] TEMPERATURE COMPENSATING MEANS FOR A HYDRAULIC SHOCK ABSORBER

[75] Inventor: Sellers B. McNally, Homewood, Ill.

[73] Assignee: Maremont Corporation, Chicago, Ill.

[22] Filed: Mar. 11, 1971

[21] Appl. No.: 123,330

[52] U.S. Cl................... 188/277, 137/79, 137/468
[51] Int. Cl.............................................. F16f 9/52
[58] Field of Search....... 188/276, 277; 137/79, 468

[56] References Cited
UNITED STATES PATENTS

| | | | |
|---|---|---|---|
| 2,899,023 | 8/1959 | Rumsey | 188/277 |
| 2,820,473 | 1/1958 | Reiners | 137/468 |
| 2,909,248 | 10/1959 | Gies | 188/277 |

FOREIGN PATENTS OR APPLICATIONS

| | | | |
|---|---|---|---|
| 667,164 | 7/1963 | Canada | 188/277 |

*Primary Examiner*—George E. A. Halvosa
*Attorney, Agent, or Firm*—Cushman, Darby & Cushman

[57] ABSTRACT

A hydraulic shock absorber having a working chamber, a piston slidably disposed in the working chamber and having a piston rod attached thereto extending outwardly of the chamber; a fluid passage is formed through the piston and is in fluid communication with an axial bore formed in the piston rod; a radial bore is provided in the piston rod to establish fluid communication with the axial bore so that, when the piston moves through a rebound stroke hydraulic fluid may flow from one side of the piston to the other through the radial bore and axial bore of the piston rod and through the fluid passage formed in the piston; an elongated element made of a material having a coefficient of thermal expansion that is greater than the material from which the piston rod is made is disposed in the axial bore of the piston rod and has one end thereof fixedly attached to the portion of the piston rod defining the inner end of the axial bore and the other end thereof disposed in a flow restricting relation with respect to the radial bore which varies in response to temperature changes of the hydraulic fluid whereby substantially constant damping effect is provided over a range of temperature variations.

7 Claims, 4 Drawing Figures

PATENTED FEB 12 1974  3,791,494
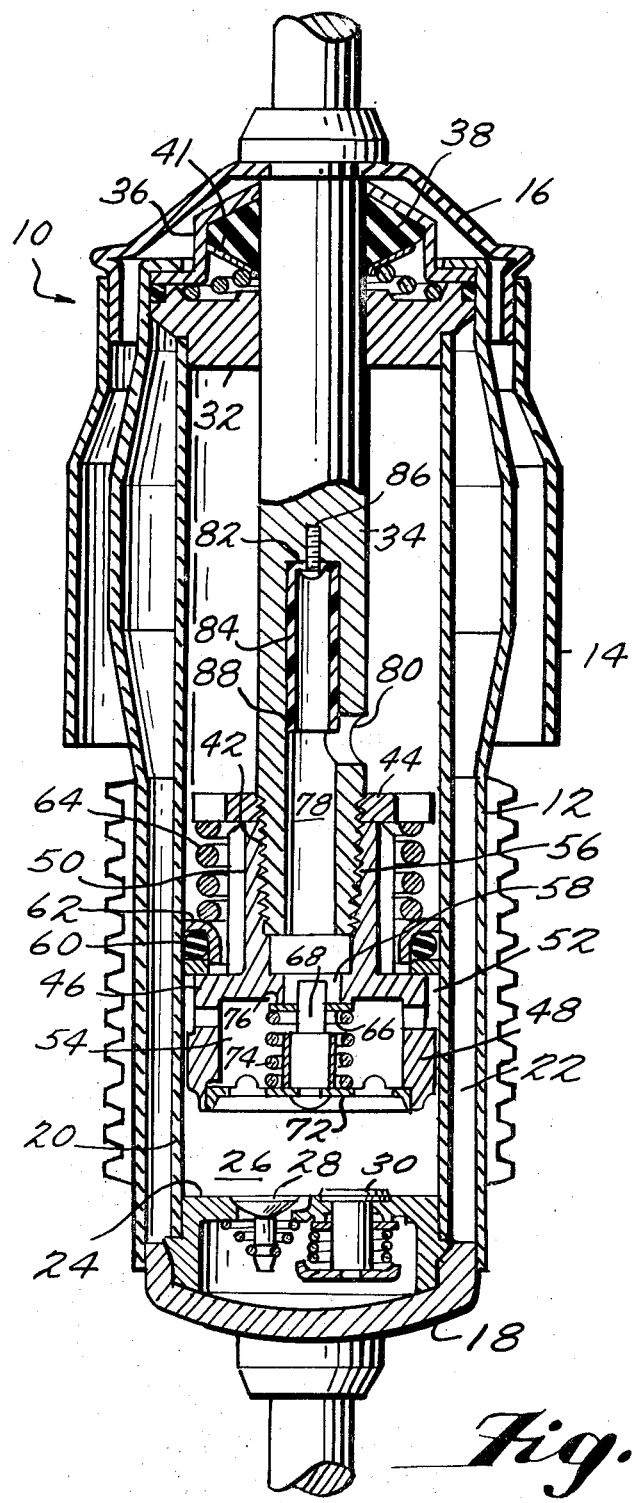
Fig. 1.
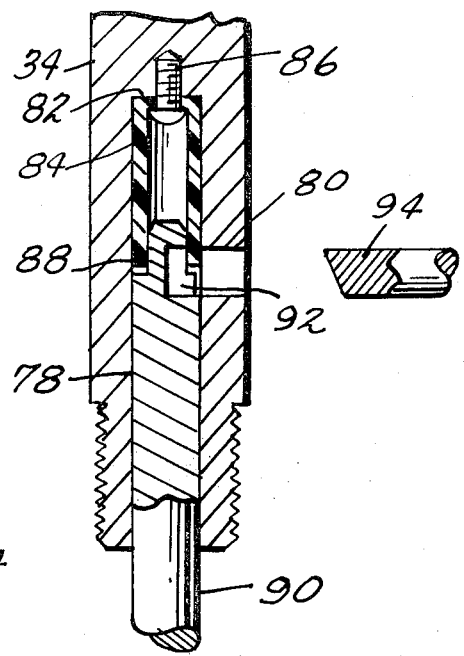
Fig. 2.
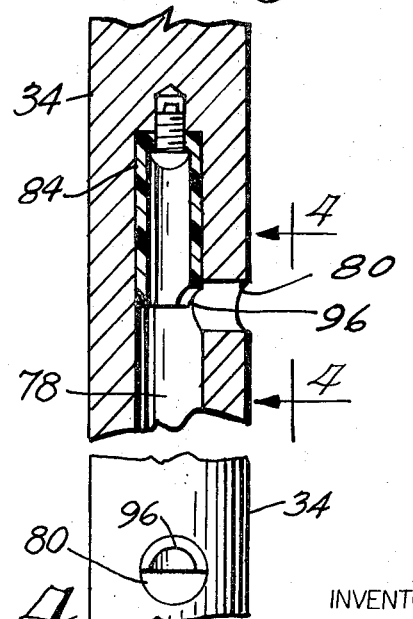
Fig. 3.
Fig. 4.
INVENTOR
SELLERS B. MCNALLY
BY Cushman, Darby & Cushman
ATTORNEYS

TEMPERATURE COMPENSATING MEANS FOR A HYDRAULIC SHOCK ABSORBER

BACKGROUND OF THE INVENTION

The present invention relates to hydraulic shock absorbers adapted to be mounted between the sprung mass and the unsprung mass of a vehicle body. More particularly the present invention relates to a temperature responsive flow restricting element disposed in a fluid passage formed in the piston rod of the shock absorber to control fluid flow therethrough.

The damping characteristics of a hydraulic shock absorber depends for the most part on fluid control means which restrict the flow of fluid from one part of the shock absorber to another when the elements of the shock absorber move relative to one another. Generally, such control means have consisted in spring biased valve elements and flow passages having variable sized inlet or outlet orifices. The resistance to fluid flow through such control means depends to a great extent upon the viscosity and density of the fluid used in the shock absorber. The viscosity and density of hydraulic shock absorber fluids presently in use vary inversely with respect to their temperature. That is to say, at a high temperature, the hydraulic fluid has a low viscosity and density which reduces the ability of the shock absorber to damp relative movement between the vehicle components.

The hydraulic fluid of a shock absorber will absorb heat not only from the ambient atmosphere but also due to the fact that, when a fluid is subjected to pressure, its temperature increases in proportion to the energy that is absorbed. It is clearly desirable then from the point of view of driving safety that the damping characteristics of vehicle shock absorbers be maintained as uniform as possible over a broad range of temperature variations. It is particularly desirable to maintain uniform damping characteristics where a vehicle is driven over rough terrain which normally causes large variations in temperature and therefore large changes in fluid viscosity and density.

While the provision of temperature compensating means is shock absorbers has long been known, the arrangements suggested by the prior art have, in general, involved relatively expensive manufacturing procedures due to the fact that very precise tolerances have been required to obtain the desired compensating operation. Moreover, a number of the structures of the prior art have relied upon bi-metallic materials to effect the temperature compensating function, which materials, it has been discovered, are relatively slow acting in relation to the rapid variations in fluid viscosity and density which occur when large temperature variations take place.

In other arrangements, use has been made of various thermo-plastic materials in place of bi-metallic elements to effect the temperature compensation. In general, however, adequate provision in terms of the placement of such plastic materials has been lacking so that, if the temperature of the shock absorber fluid exceeds the working temperature of the plastic material, the plastic material may become displaced from its location or its shape distorted resulting in blockage of a fluid passage which may result in shock absorber failure.

The present invention, however, provides a shock absorber structure having temperature compensating means which avoids the foregoing disadvantages and which provides a relatively less expensive method of manufacture then has heretofore been possible.

SUMMARY OF THE DISCLOSURE

In the preferred embodiment of this invention, a hydraulic shock absorber is provided with a cylindrical chamber and a fluid reservoir and valve means for controlling fluid flow between the chamber and reservoir. A piston is slidably disposed in the chamber and has a piston rod extending from one side outwardly of the chamber. Suitable sealing means are provided around the portion of the piston rod extending through the end of the chamber and suitable attachment means are provided on the end of the piston rod as well as on the other side of the chamber on the exterior thereof for mounting the shock absorber between the sprung and unsprung components of the vehicle body. A fluid passage is formed through the piston and is in fluid communication with an axial bore formed in the piston rod. A radial bore or orifice is formed in the piston rod to communicate with the axial bore, the radial orifice being spaced along the piston rod a distance from the side of the piston to which the piston rod is attached. A hollow tubular temperature compensating element is disposed in the bore of the piston rod having one end fixed therein and its other end disposed adjacent the radial orifice in flow restricting relation thereto. The temperature compensating element is chosen to have a high co-efficient of thermal expansion so that, as the temperature of the hydraulic fluid increases, the tubular element will expand to restrict the radial orifice formed in the piston rod. The present invention also relates to a method for mounting the temperature compensating element in the bore of the piston rod whereby very precise registration between the edge of the temperature compensating element and the radial orifice can be effected without requiring precision machining of the respective components.

Briefly, the method consists in fixing the tubular element in the bore of the piston rod with the end portion of the element obstructing the radial orifice. A mandrel having a die cavity is inserted into the bore so that the die cavity is in alignment with the radial orifice. A cutting tool or punch is then inserted into the radial orifice to cut a segment from the edge of the element to obtain the desired registry between the orifice and the edge of the temperature compensating element.

Accordingly, it is a principal object of the present invention to provide a shock absorber structure having means that automatically compensate for variations in the viscosity and density of the shock absorber fluid which occur as a result of the temperature changes of the fluid so that substantially uniform damping characteristics will be obtained over a wide range of operating conditions.

Another object of the present invention resides in the provision of a temperature compensating element which responds rapidly to temperature changes of the hydraulic fluid in the shock absorber.

A still further object is to provide temperature compensating means in a shock absorber that functions independently of the conventional means provided in the shock absorber for controlling fluid flow.

A further object of the present invention is the provision of a method for constructing the temperature compensating means within a hydraulic shock absorber in a more economical and expeditious manner than has previously been proposed.

BRIEF DESCRIPTION OF THE DRAWING

These and other objects and attendant advantages of the present invention will become apparent upon consideration of the following detailed description together with the accompanying drawings in which:

FIG. 1 is an elevational view in cross-section of the shock absorber of the present invention;

FIG. 2 is an elevational view in cross-section illustrating a step in the method of the present invention;

FIG. 3 is an enlarged sectional view of the temperature compensating means of the present invention; and FIG. 4 is a view in elevation taken along the line 4—4 of FIG. 3.

DETAILED DESCRIPTION OF THE INVENTION

Referring now to the drawings wherein like numerals indicate like or corresponding parts throughout the several views, there is illustrated in FIG. 1 a shock absorber 10 of the double-acting hydraulic type comprising a substantially cylindrical outer casing 12 which is capable of relative telescopic movement within a cylindrical guard or shield 14 that is spaced radially outwardly from the casing 12. The upper end of the shield 14 is closed by an inverted cupshaped closure or cap member 16 which is secured thereto with a suitable connection. It will be understood, of course, that the cap member 16 may be secured by a threaded connection or by welding, soldering or by other conventional means. The cap member 16 may be provided with conventional means such as an eyelet (not shown) to facilitate the mounting of the shock absorber in a vehicle suspension system. The lower end of the casing 12 is closed by a cup-shaped closure member 18 which may be provided on its outer side with conventional means (not shown) for mounting the lower end of the shock absorber in a vehicle suspension system.

A working cylinder 20 is disposed within the casing 12 in spaced, concentric relationship therewith so that the space defined by the casing 12, the wall of cylinder 20, closure member 18 and a closure member for the upper end of the cylinder, later to be referred to, constitutes a reservoir 22 for the hydraulic fluid in the shock absorber.

The lower end of the working cylinder 20 is connected to an inverted cup-shaped closure and valve cage member forming an end wall 24 for the working chamber 26 formed by the working cylinder 20. End wall 24 is also connected to the closure member 18. The end wall 24 carries a replenishing valve means 28 and compression valve means 30. It will be understood that during the compression or downward stroke of the piston of the shock absorber, the fluid will flow from the working chamber 26 through the compression valve assembly 30 when a predetermined fluid pressure occurs and then through passages (not shown) between wall 24 and the closure member 18 and into the reservoir 22. During the rebound or upward stroke of the piston with respect to the end wall 24, the replenishing valve 28 unseats and fluid flows from the reservoir 22 through the replenishing valve assembly and into the working chamber 26 below the upwardly moving piston.

The upper or high pressure end of the working chamber 26 is closed by a plug member 32 having a centrally disposed opening therethrough for slidably receiving the piston rod 34. The upper end of the casing 12 is closed by a closure member 36 which is suitably secured to the casing 12. Member 36 is also provided with a centrally disposed recess in which is arranged a double conical piston rod packing 38 through which the piston rod extends and passes outwardly of the member 36 by means of the central opening provided in the latter. The piston packing 38 is held under compression by a coiled spring 40 acting on a ring 41 disposed around the tapered inner end of the packing and also abutting the plug member 32.

The piston rod 34 has its lower end threaded, as indicated at 42, and screwed on this threaded end 42 of the piston rod is a spring abutment plate 44 as well as the piston 46 which includes a lower, enlarged portion 48 of a diameter such as to slidably interfit with the working cylinder 20. The piston 46 further includes an upper portion 50 of a reduced diameter. The periphery of the lower portion 48 is provided with a plurality of circularly spaced axially extending grooves or passages 52 which communicate through a chamber 54 with the space below the piston and the annular space between the upper portion 50 and the interior wall of the working cylinder 20.

The lower portion 48 of the piston 46 is provided with the chamber 54 which also communicates at its upper end with a passage 58 formed centrally of the piston at the junction of the lower portion 48 and the reduced upper portion 50 thereof. The reduced upper portion 50 of the piston is provided with a central bore or passage 56 of larger diameter than the passage 58 but disposed co-axially therewith. The interior wall of the bore 56 is threaded so that the piston can be screwed onto the lower end 42 of the piston rod 34 until the upper end of the portion 50 of the piston engages the spring abutment plate 44.

A flexible packing and valve ring 60 of normally circular cross-section and formed of any suitable material, such as natural or synthetic rubber for example, is mounted on a carrier 62 which is slidable on the upper portion 50 of the piston. Carrier 62 is in the form of a ring of angle cross-section and its axially extending flange slides on the portion 50 of the piston, while its radially extending flanges contact the packing and valve ring 60. A coil spring 64 surrounds the portion 50 of the piston and has one of its ends abutting the plate 44 and its opposite end the radially extending flange of the carrier 62 thereby functioning to maintain the carrier 62 and the packing and valve ring 60 in the position shown in FIG. 1, wherein the carrier is abutting the larger or lower portion 48 of the piston, while the ring 60 acts as a valve sealing off the flow of fluid from the underside of the piston through the passages 52 to the upper side of the piston. It will be understood that during the compression or downward stroke of the piston, occasioned by the compression of the vehicle springs, as soon as the fluid pressure below the piston overcomes the load of the spring 64, the valve ring 60 and the carrier 62 will move upwardly along the portion 50 of the piston and away from the portion 48 to allow the flow of fluid upwardly through the passages 52. The valve ring 60 constitutes the piston compression valve in that it controls the flow of fluid from the lower portion of the piston to the upper side thereof during the compression stroke of the piston in the working chamber 26.

For control of the fluid during the rebound stroke of the piston, a rebound valve is provided which consists of a valve disc 66 slidably mounted on the stem 68 of the valve pin 70. One end of the valve pin 70 is secured to a retainer member 72 which is fixed in the lower end of chamber 54. Apertures are provided in the retainer 72 to allow fluid flow therethrough. A coil spring 74 is disposed about the valve pin 70 and has one end abutting the inner side of retainer member 72 and its other end engaging the underside of the valve disc 66 to constantly urge the latter into engagement with the valve seat 76 formed about the mouth of passage 58 opening into chamber 54.

An axial bore 78 is formed in the lower threaded end of piston rod 34 and a radial orifice 80 is provided in the piston rod at a point spaced from the closed end 82 of the bore 78. The orifice 80 is also spaced a distance from abutment plate 44 so that, when the piston moves through its rebound stroke, a fluid cushion will be provided when orifice 80 passes out of the working chamber 26 thereby cutting off the fluid passage for the fluid trapped above the piston. As the piston moves through its rebound stroke, pressure will build up above the valve disc 66 until the force of spring 74 is overcome whereupon fluid will flow from above the piston through orifice 80 and bore 78 through piston passage 58 and through the chamber 54. It will be understood, of course, that when the piston moves through its compression stroke, valve disc 66 will remain seated and fluid flow through these passages is prevented.

A tubular temperature responsive restrictor element 84 is positioned in bore 78 with one end secured to the closed end 82 of the bore by any suitable means such as a drive nail 86. Element 84 is constructed so that its other end 88 will be adjacent the orifice 80 in flow restricting relationship thereto. The element 84 should be fabricated from a material having a high coefficient of thermal expansion relative to the material from which the piston rod is made. For example, it has been found that where steel is used for the piston rod, nylon, e.g., polycaprolactum (nylon 6), polyhexamethylene adipamide (nylon 6,6) or polyhexamethylene sebacamide (nylon 6,10) are suitable for element 84. The expansion and contraction of the element 84 relative to the bore 78 in response to temperature changes of the shock absorber fluid will cause the effective flow area of the orifice 80 to increase or decrease in cross-sectional area and thereby compensate for changes in the viscosity and density of the shock absorber fluid which would otherwise adversely affect the damping characteristics of the shock absorber. Of course, the material used in the manufacture of the element 84 should be selected to be able to accomodate the viscosity and density changes of the particular fluid used in any given shock absorber. It should be noted that the exterior diameter of element 84 closely conforms to the interior diameter of that portion of the bore 78 between end 82 and the orifice 80.

With reference now to FIG. 2, there is illustrated the method of the present invention for accurately yet simply assembling the restrictor element 84. After element 84 has its one end secured to the closed end 82 of the bore 78 the lower end 88 partially blocks orifice 80 when the element is in its unexpanded state. To obtain accurate registry between the lower end 88 of restrictor element 84 and the orifice 80, a mandrel 90 having a die cavity 92 at one end is inserted into the bore 78 of the piston rod 34. The die cavity 92 has a circular cross-section and has a diameter substantially equal to the diameter of the orifice 80. The end most portion of the mandrel 90 is of a reduced diameter so as to snuggly fit into the lower end 88 of the element 84. Next, a punch 94 is inserted through orifice 80 to cut out the orifice obstructing segment of the element 84. With reference to FIGS. 3 and 4, it will be noted that the small, semi-circular lip 96 remains partially obstructing the orifice 80 so that at least a portion of the restrictor element 84 will be continually in contact with the moving hydraulic fluid. In this arrangement, the response of the restrictor element 84 to temperature variations in the hydraulic fluid will be more immediate than if the restrictor element was removed from the point at which the fluid was subjected to restriction.

It will be readily appreciated by those skilled in the art that the foregoing method of assembly substantially reduces the cost and labor involved since the manufacturing tolerances on the length of the restrictor element 84 as well as the depth of the axial bore 78 and the axial location of the orifice 80 need not be precisely maintained while very close registry between the edge of the restrictor element and the edge of the orifice is obtained.

It will be understood from the foregoing that various modifications in the present invention may be made without departing from the spirit and scope thereof as defined in the appended claims.

What is claimed is:

1. A hydraulic shock absorber adapted to be connected between the sprung and unsprung masses of a vehicle comprising a tubu'ar structure having an end wall at one end thereof provided with means on the exterior thereof for connecting the shock absorber to one of the vehicle masses, said tubular structure defining a hydraulic fluid containing reservoir and a hydraulic fluid containing cylindrical chamber, a piston disposed within said chamber dividing the same into a compression portion and a rebound portion, said piston being axially movable within said chamber toward said end wall in a compression stroke and away from said end wall in a rebound stroke, a metallic piston rod extending through said rebound chamber portion having an inner end portion connected with said piston and an outer end portion provided with means for connecting the shock absorber with the other of the vehicle masses, said tubular structure having means at the end thereof opposite from said one end forming a fluid-tight seal about the exterior periphery of said piston rod intermediate the ends thereof, and means for controlling the flow of hydraulic fluid (1) from said compression chamber portion to said rebound chamber portion and said reservoir in response to the compression stroke of said piston and (2) from said rebound chamber portion and said reservoir to said compression chamber portion in response to the rebound stroke of said piston, said flow controlling means including interior surface means in said piston rod provided as an integral part of the metal thereof defining an axial opening extending axially inwardly from the inner end of said piston rod and terminating in a substantially spaced relation to the outer end thereof, and radial opening means in said piston rod communicating exteriorly with said rebound chamber portion and interiorly with said axial opening intermediate the ends thereof, and an elongated element formed of a material having a coefficient of thermal expansion that is greater than that of the material of said piston rod, said element being disposed by an axially inward mounting movement within said axial opening with one end portion thereof mounted in fixed relation to the surface means defining the terminal end of said axial opening and with the opposite end portion thereof being free of spring bias and disposed in a flow-restricting relation to said radial opening means which varies in response to changes in the temperature thereof due to the aforesaid variation in coefficient of expansion so as to provide a control of the flow of hydraulic fluid from said rebound chamber portion to said compression chamber portion during the rebound stroke of said piston which compensates for changes in temperature of the hydraulic fluid.

2. A shock absorber as defined in claim 1 wherein said opposite end portion of said element is formed with flow-restricting surface means having a predetermined registry with said radial opening means at a temperature corresponding to that existing at the time of the formation thereof which is subsequent to the fixed mounting of said element within said axial opening.

3. A shock absorber as defined in claim 1 wherein an axially disposed fastener portion extends in fixed relation to the one end portion of said element and the piston rod adjacent the terminal end of said axial opening to effect said fixedly mounted relationship.

4. A shock absorber as defined in claim 1 wherein said element is of hollow cylindrical configuration having an end wall adjacent said one end thereof.

5. A shock absorber as defined in claim 4 wherein an axially disposed fastener portion extends in fixed relation to said element end wall and the piston rod adjacent the terminal end of said axial opening to effect said fixedly mounted relationship.

6. A shock absorber as defined in claim 5 wherein said radial opening means comprises a single radial opening of circular cross-section, said cylindrical element having a generally semi-circular shaped opening formed in said opposite end portion thereof at a position having a predetermined registry with said radial opening at a temperature corresponding to that existing at the time of the formation of said semi-circular opening which is subsequent to the fixed mounting of said element within said axial opening.

7. A shock absorber as defined in claim 6 wherein said element is made of nylon.

* * * * *